Feb. 18, 1941. C. A. MATHEY 2,232,252
CONTROLLED POWER TRANSMISSION APPARATUS
Filed May 21, 1938 3 Sheets-Sheet 1

INVENTOR
Chester A. Mathey.
BY
ATTORNEY

Feb. 18, 1941. C. A. MATHEY 2,232,252
CONTROLLED POWER TRANSMISSION APPARATUS
Filed May 21, 1938 3 Sheets-Sheet 3
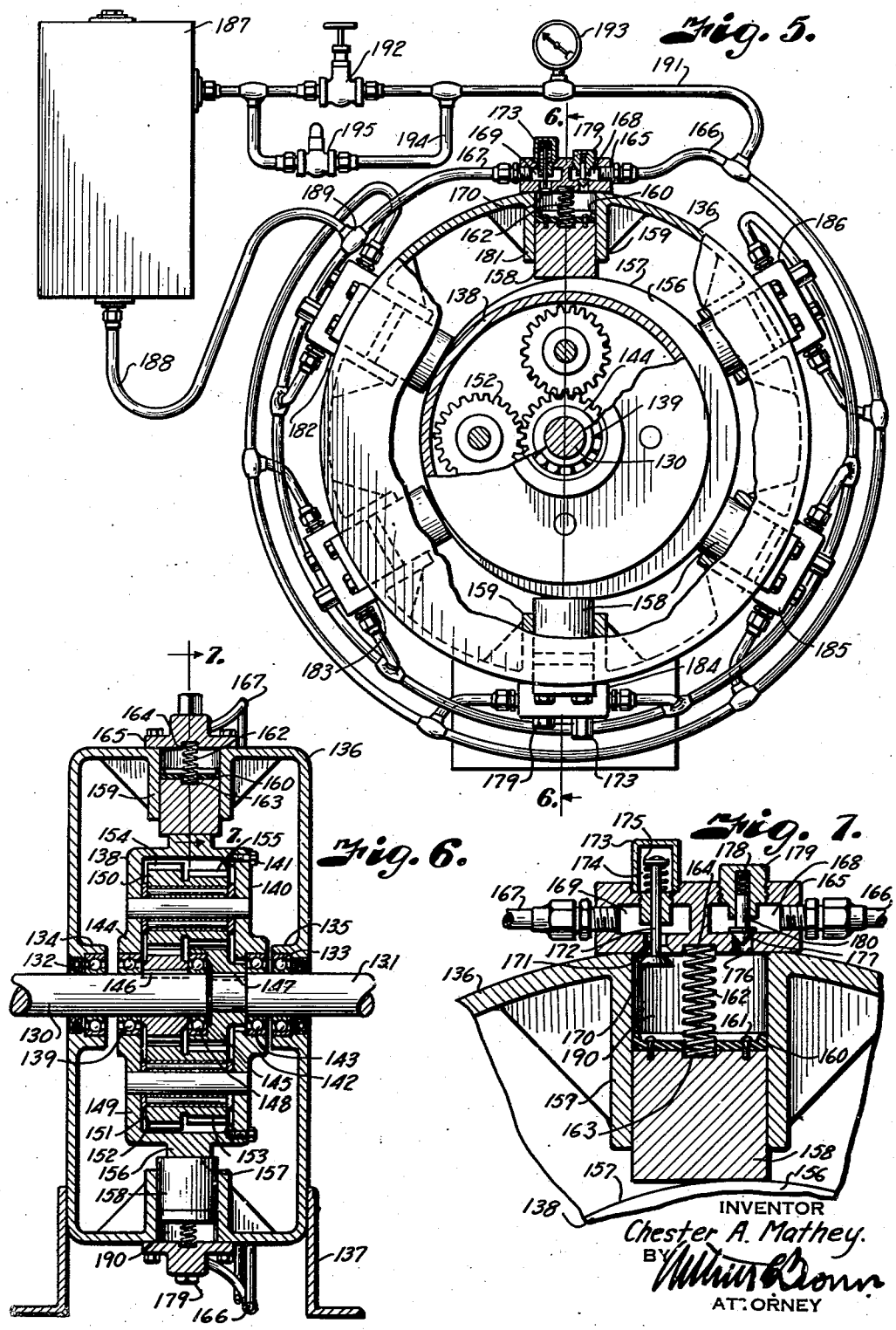
INVENTOR
Chester A. Mathey.
BY
ATTORNEY Patented Feb. 18, 1941

2,232,252

UNITED STATES PATENT OFFICE 2,232,252

CONTROLLED POWER TRANSMISSION APPARATUS

Chester A. Mathey, Tulsa, Okla.

Application May 21, 1938, Serial No. 209,258

2 Claims. (Cl. 188—90)

This invention relates to a controlled power transmission apparatus, and more particularly to an apparatus of that character, the speed of operation of which is variable, and the driving and driven constituents of which have interchangeable relation to each other.

The principal objects of the present invention are to provide a durable and efficient apparatus adapted for the controlled transmission of mechanical power for any desired purpose; to provide a speed and/or pressure control for the apparatus; to actuate the speed and/or pressure control incidental to actuation of the apparatus; to provide for independently controlling the speed control; to provide automatic safety factors for the apparatus; to provide for regulating actuation of the apparatus in relation to speed of and/or pressure on the apparatus; to provide improved elements in an apparatus of this character; and to provide an improved organization of such elements.

In accomplishing these and other objects of the present invention, I have provided improved details of structure, the preferred forms of which are illustrated in the accompanying drawings, wherein:

Fig. 5 is a side elevational view of a further modified form of invention, parts of the transmission gear housing and stationary mounting being broken away to illustrate reciprocating pump plungers and planetary gearing for transferring controlled power between a driven and a driving member.

Fig. 6 is a vertical cross-section through the apparatus illustrated in Fig. 5 on the line 6—6, Fig. 5.

Fig. 7 is a detail vertical cross-section through one of the reciprocating pump plungers on the line 7—7, Fig. 6.

Figure 1:
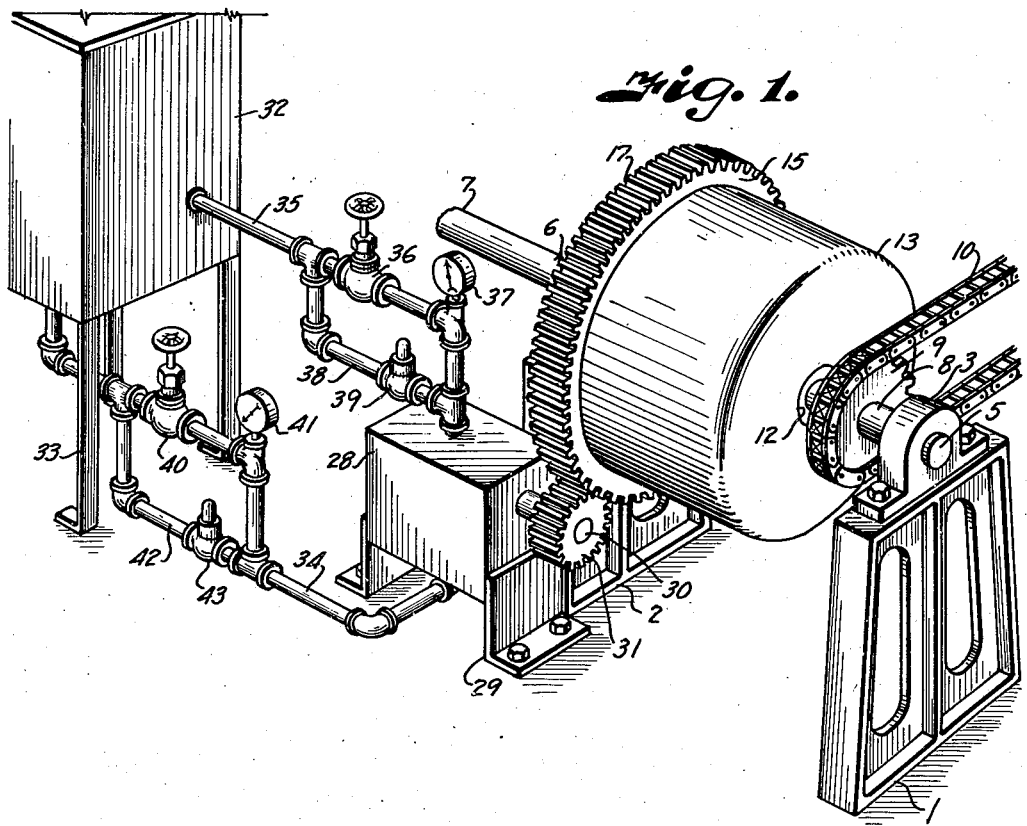
Fig. 1 is a perspective view of an apparatus embodying the features of the present invention.
Figure 2:
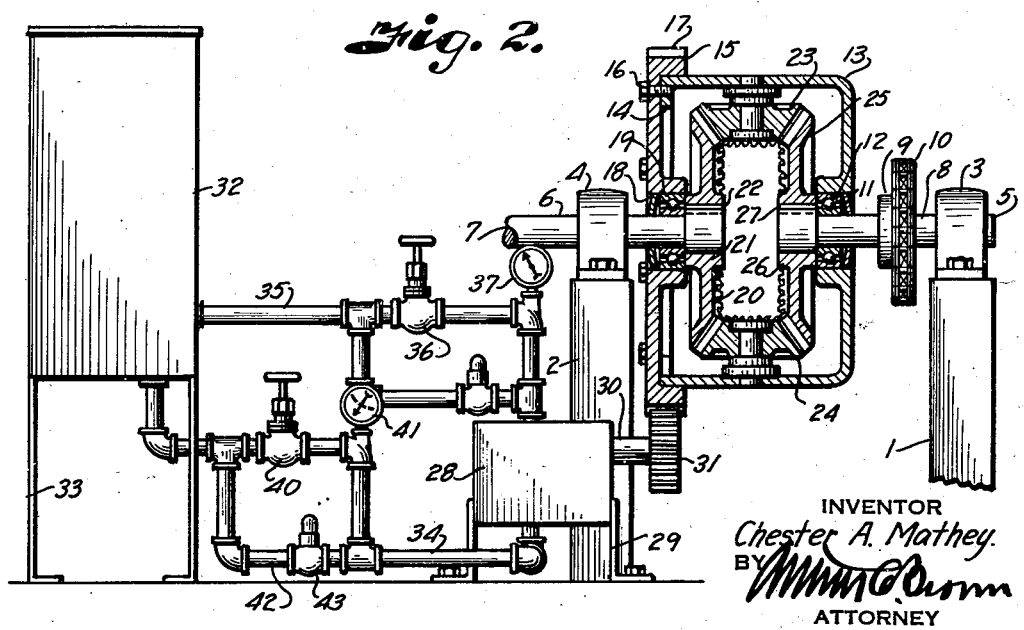
Fig. 2 is a side elevational view of the apparatus shown in Fig. 1, the transmission gear housing being shown in vertical cross-section to illustrate a suitable type of gearing for interconnecting the driven and driving members.

Referring more in detail to the drawings:

In Figs. 1 and 2, 1 and 2 designate suitable standards having pillow blocks 3 and 4 provided with bearing openings for receiving the ends 5 and 6 of driven and driving members, which are interchangeable in relation to each other for those purposes. For the sake of convenience, the shaft 7 will be considered the member driven by a suitable source of power, not shown, and the shaft 8 will be termed the driving member, the shaft 8 having a suitable power take-off 9 fixed thereto which, in the present instance, is in the form of a sprocket wheel having a chain 10 leading to an apparatus, not shown, desired to be driven.

The inner end of the shaft 8 is rotatably mounted in a bearing 11, the bearing being mounted in an opening 12 at one side of a transmission gear housing member 13, the opposite side 14 of which housing member is closed by a ring gear 15 which is fixed to the housing as by fastening devices 16. The ring gear 15 is provided with gear teeth 17 at its periphery and is provided at its center with an opening 18 adapted to receive a bearing 19 in which the inner end 6 of the driven shaft 7 is rotatably mounted.

In the present instance, a differential system of gears is illustrated in the rotatable gear transmission housing 13, it being apparent, however, that other systems of gears may be mounted in the housing so, long as they interconnect the driven and driving shafts 7 and 8.

In Fig. 2, 20 designates a beveled driving gear which has a hub 21 keyed, as at 22, on the driven shaft 7. 23 and 24 designate beveled planetary pinions rotatably mounted in oppositely disposed relation and in fixed position in the housing 13, the pinions having gear teeth adapted to mesh with the gear teeth of the driving gear 20. 25 designates a driven beveled gear having teeth adapted to mesh with the teeth of the planetary pinions 23 and 24 and having a hub 26 keyed to the driving shaft 8, as shown at 27.

With the construction thus far described, it is apparent that when the housing is held stationary, power applied to rotate the shaft 7 rotates the shaft 8 through its gear connection with the shaft 7, and that power may consequently be taken off the shaft 8 by the chain 10 for any desired purpose.

In order to control speed of rotation of the transmission gear housing, and consequently speed of rotation of the driving shaft 8, a pump 28 is provided, preferably of hydraulic type. The pump is mounted on suitable standards 29 and provided with an actuating shaft 30, having a pinion gear 31 thereon meshing with and driven by the teeth 17 of the ring gear 15. A reservoir 32 suitably supported on standards 33 and adapted to contain fluid pressure medium for circulation through the pump 28 is also provided. Communication between the pump and reservoir for passing fluid pressure medium therebetween is had by the lines 34 and 35, one of which may be a flow line and the other of which may be a discharge line. For the purpose of illustration, the line 34 will be considered the flow line and the line 35 will be considered the discharge line.

The speed of actuation of the pump 28 is preferably controlled by a throttle valve 36 mounted in the discharge line and which is adjustable in the usual manner to apply desired resistance to discharge of fluid pressure medium from the pump to the reservoir.

It is sometimes very important to ascertain the pressures on the pump in order to determine the speed of actuation of the pump and consequently the driving member, and also to ascertain when excessive loads are placed on the driving member so the throttle valve may be adjusted in accordance with the load and thus relieve the apparatus of unnecessary or dangerous strains. The gauge 37 is therefore provided, preferably in the discharge line 35, for indicating pressures at which an operator may actuate the throttle valve 36 for obtaining a proper degree of adjustment of fluid pressures on the pump.

In order to further control maximum speed and pressures of and on the pump, and consequently safeguard the various elements of the organization, a line 38 is provided for by-passing fluid pressure medium in the discharge line 35 about the throttle valve 36, the line 38 being provided with a relief valve 39, which may be set to pass fluid pressure medium through the bypass line 38, when pressures in the discharge line 35 exceed a predetermined maximum.

When driving some mechanisms, for example when raising and lowering an object, it is necessary to reverse the direction of travel of the power unit. I have therefore provided means for controlling speed of actuation of the apparatus in either direction by employing a rotary pump capable of pumping fluid when driven in either direction.

When the direction of actuation of the apparatus is reversed, the relation of the flow and discharge lines 34 and 35 is also reversed. Thus, when the line 35 is employed as a flow line and the line 34 is employed as a discharge line, the line 34 may be provided with a throttle valve 40, similar to the throttle valve 36, and a pressure gauge 41, a by-pass line 42 also being provided having a relief valve 43 therein for the purpose and having the functions of the by-pass line 38 and relief valve 39 previously described.

With the provision described, it is apparent that the control and relief valves on one line may be set to provide a given speed of actuation in one direction and the control and relief valves on the other line may be set to provide a given speed of actuation in the reverse direction.

The operation of an apparatus constructed as described is as follows:

Suitable power applied to the driven shaft 7 to rotate the same in its pillow block 3 rotates the driving gear 20 in one direction and the driven gear in the opposite direction through its connection with the planetary pinions 23 and 24, the shaft 8 rotating in its pillow block 4 and power being taken off the shaft 8 by the chain 10.

As the driving gear 20 rotates, due to the load on the shaft 8, the transmission gear housing 13 rotates in the same direction to rotate the ring gear 15 in the same direction and the pinion gear 31 of the pump 28 in an opposite direction, the pinion gear actuating the pump to force fluid pressure medium through the discharge line 35 into the reservoir 32 and from the reservoir through the flow line 34 back to the pump. Flow of fluid pressure medium between the pump and reservoir is controlled by the throttle valve 36 and the pressures in the flow line are indicated by the gauge 37. By adjusting the throttle valve 36 in relation to the pressures indicated on the gauge 37, or the speed of actuation of the apparatus receiving power from the transmission, a proper amount of resistance is imparted to the rotating transmission gear housing, which affects rotation of the driving shaft 8, and thus controls application of power of the driving member for any desired purpose. When the load on the driving shaft 8 exceeds a predetermined maximum, the transmission gear housing will drive the pump at sufficient speed to raise the discharge pressure acting against the throttle valve 36, in which event fluid pressure medium in the by-pass line 38 "kicks-off" the relief valve 39 and relieves the valve 36 of the pressure thereon and consequently relieves the transmission gear housing of the excess of resistance to rotation, and allows the speed of the housing to increase and the speed of shaft 8 to decrease in such a manner that excessive strains on the whole organization are avoided.

It should be apparent that in an organization of the character described three primary elements are involved, any one of which may be the driven member and either of the other two of which may be the driving and/or control members. Different forms of the arrangement between the primary elements have been illustrated in the various figures of the drawings, but in each case the principles involved and the results obtained are substantially the same. It is, therefore, believed obvious that the principal features of invention include, in any of the forms of invention shown, the application of a pump to one of the rotating elements of a planetary power transmission system, the provision of a throttle valve in a line or lines connecting the reservoir and pump for controlling the speed of the driving shaft regardless of the direction of travel, and the provision of a relief valve in the connecting line or lines, which in response to an excessive load on the driving shaft stops rotation of the driving shaft, thus avoiding damage to any mechanism connected to the transmisison.

Figure 3:
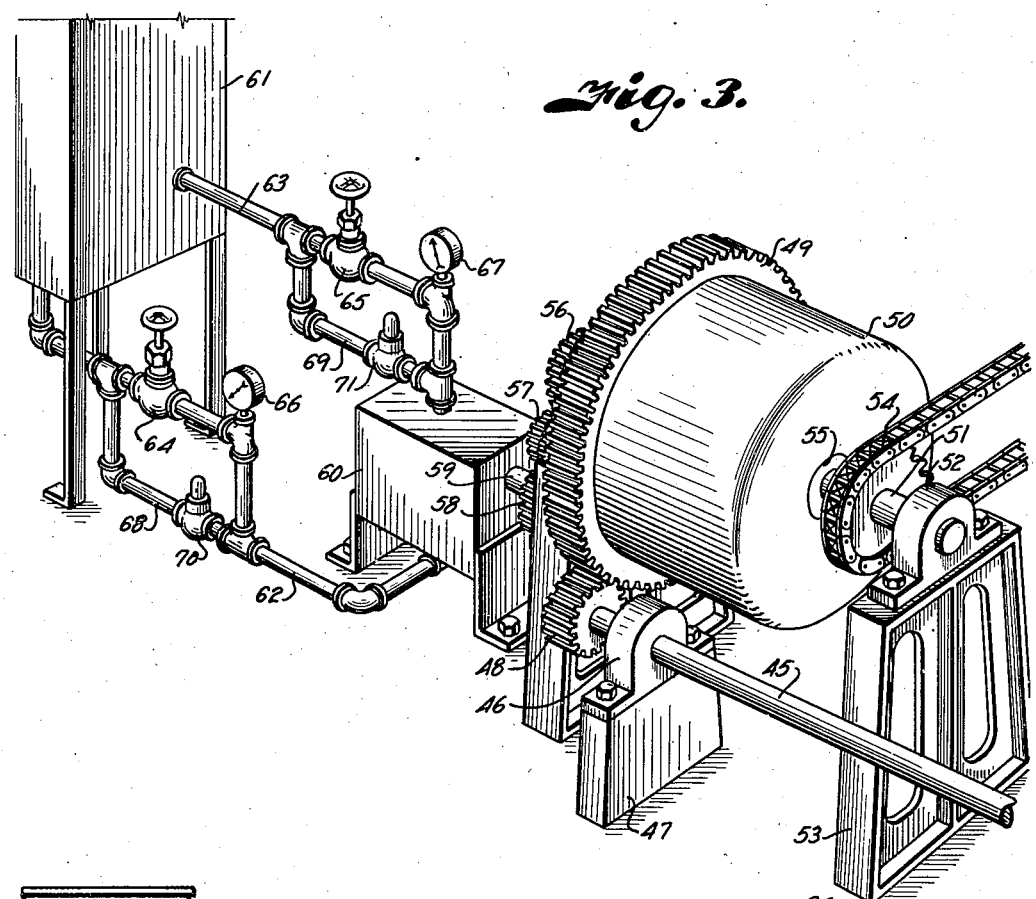
Fig. 3 is a perspective view of a modified form of the present invention illustrating an arrangement wherein one of the driven or driving members is engaged with the transmission gear housing.

In Fig. 3 a modified form of invention is shown wherein a driven member in the form of a shaft 45, rotatably mounted in the pillow block 46 on a suitable standard 47, is provided at one end with a pinion gear 48 having teeth engaged with peripheral teeth on a ring gear 49 closing one end of a transmission gear housing 50.

The driving member, in this instance, consists of a shaft 51 rotatably mounted in a pillow block 52 on a suitable standard 53, the shaft 51 having a power take-off 54 fixed thereto and having its inner end rotatably mounted in a bearing 55 fixed at the center of one side of the transmission housing 50.

It is apparent that in the arrangement illustrated in Fig. 3, the transmission gear housing may contain gears of differential or planetary type.

In either event, such gears interconnect the driving member or shaft 51 with an oppositely disposed shaft rotatable in an opposite direction and having a pinion gear 56 on the outer end thereof meshing with a train of reduction or like gears 57, which terminate in a pinion gear 58 mounted on the end of a shaft 59 for actuating a pump 60 preferably of hydraulic type.

As in the form of invention illustrated in Figs. 1 and 2, a fluid pressure medium reservoir 61 is provided which communicates with the pump through flow and discharge lines 62 and 63, respectively, the flow and discharge lines being respectively provided with throttle valves 64 and 65, gauges 66 and 67, by-pass lines 68 and 69 having relief valves 70 and 71 therein, similar to, for the purposes, and having the functions of the corresponding devices disclosed in connection with the form of invention illustrated in Figs. 1 and 2.

The operation of an apparatus constructed in accordance with the form of invention illustrated in Fig. 3 is substantially similar to that already described, with the exception that power from a suitable source is applied to rotate the shaft 45 which in turn drives the gear transmission housing 50 in an opposite direction through meshing engagement of the pinion gear 48 and ring gear 49. Power may, however, be taken off the shaft 51 for any desired purpose. The pump 60 is actuated, in this instance, through its connection, by the train of gears 56, 57 and 58, with the internal gears of the transmission housing, resistance being applied to such gears and consequently the transmission gear housing and power take-off by the pump 60 as controlled by the throttle valves 64 or 65, the adjustment of which is determined by observation of the gauges 66 or 67 or the speed of the apparatus receiving power from the transmission. The relief valves 70 and 71 automatically operate upon application of excessive pressures, over a predetermined maximum, to the flow or discharge lines to relieve the organization of unnecessary or dangerous strains.

Figure 4:
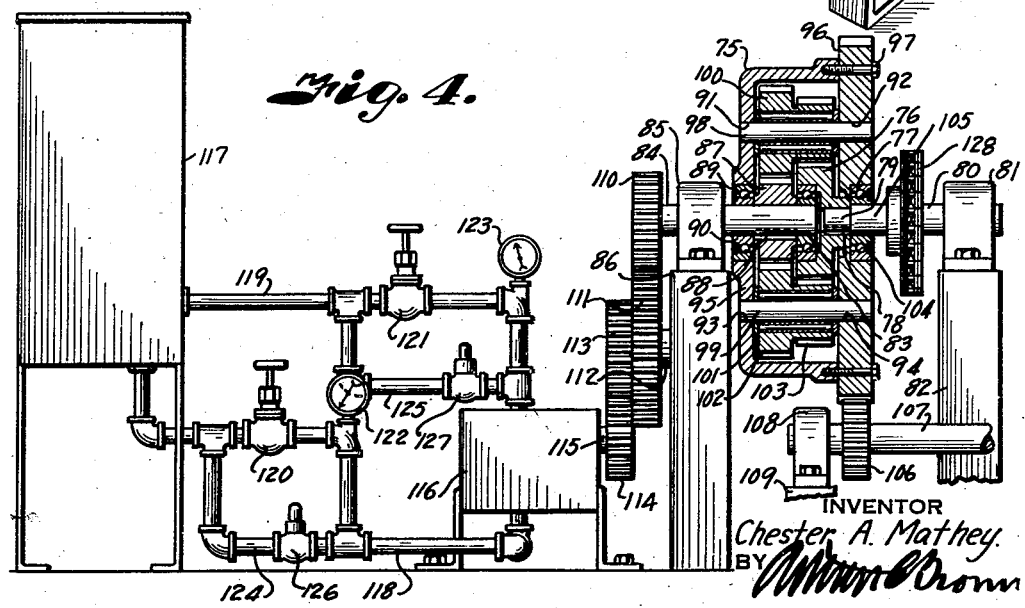
Fig. 4 is a side elevational view of an apparatus substantially similar to that illustrated in Fig. 3, but in which the transmission housing is reversed, the transmission housing being shown in vertical cross-section to illustrate planetary gears for transmitting power between the pump and the driven or driving members.

It will be understood that the position of the transmission housing is reversible and, in Fig. 4, the position thereof is reversed in relation to the showing of Fig. 3.

In Fig. 4, the transmission housing 75 is shown as provided with gears of planetary type, wherein 76 designates a sun gear having a hub 77 keyed as shown at 78 to the reduced extreme inner end 79 of a driving shaft 80, the outer end of which is mounted in the bearing portion of a pillow block 81 supported by a suitable standard 82. The sun gear 76 is further provided with a bearing 83 engaged about the inner end of a shaft 84, the shaft having its outer end rotatably mounted in the bearing portion of a pillow block 85 mounted on a suitable standard 86. The bearing 83 rotatably mounts the sun gear 76 on the inner end of the shaft 84. A sun gear 87 is keyed, as shown at 88, on the shaft 84 adjacent a bearing opening 89 at one side of the transmission gear housing, a bearing 90 being mounted in the opening to rotatably mount the gear housing on the shaft 84.

Oppositely disposed pairs of aligned openings 91—92 and 93—94 are provided in the side wall 95 of the transmission housing and the body portion of a ring gear 96, fixed to and closing one end of the housing by fastening devices 97, for receiving the outer ends of shafts 98 and 99 on which are mounted planetary gears 100 and 101. Each planetary gear has a set of gear teeth 102 engageable with the gear teeth of the sun gear 87 and each of the planetary gears is provided with a set of gear teeth 103 engageable with the gear teeth of the sun gear 76.

The ring gear 96 is provided with a bearing opening having a bearing 104 therein for rotatably mounting the ring gear on the inner unreduced portion 105 of the driving shaft 80. The ring gear is also provided with teeth on its periphery adapted to mesh with the teeth on a pinion gear 106, which is fixed to the end of a driven shaft 107, the inner end of which is rotatably mounted in a pillow block 108 mounted on a suitable standard 109.

As shown in Fig. 3, resistance is applied to rotation of the gear transmission housing by a pinion gear 110 fixed to the outer end of the shaft 84, the pinion gear meshing with a reduction gear 111 fixed to a shaft 112 rotatably mounted in the standard 86. A gear 113 is fixed to the gear 111 and also mounted on the shaft 112 which meshes with the pinion gear 114 on the shaft 115 actuating the pump 116.

As in the other forms of invention, a fluid pressure medium reservoir 117 communicates with the pump 116 through flow and/or discharge lines 118 and 119, circulation through which is controlled by throttle valves 120 and 121 which are adjusted in predetermined relation to the showing of gauges 122 and 123 effected by the speed of actuation of the pump 116 in response to actuation of the driven and/or driving members 107 and 80. By-pass lines 124 and 125 having relief valves 126 and 127 are also provided in the flow and discharge lines for the purpose previously described.

In the form of invention illustrated in Fig. 4, the operation initiates with the driven shaft 107, the power from which rotates the ring gear 96 in an opposite direction to rotate the power take-off 128 on the shaft 80 in the same direction as the driven member. Resistance is applied to rotation of the gear housing 75 by the interconnection between the shafts 80 and 84 of the planetary gears, rotation of the shaft 84 being controlled by the pump 116 through the train of gears 110 to 114 inclusive. Actuation of the pump is controlled in a manner similar to that previously described to the end that unnecessary or dangerous strains need not be applied to the organization of parts shown and the apparatus may thus serve its intended purpose over prolonged periods of time.

In Figs. 5 to 7, a further modified form of invention is shown wherein, for the purpose of illustration, 130 designates a driven member or shaft and 131 designates a driving member or shaft which may have a suitable power take-off, not shown, applied thereto in a suitable manner for any desired purpose. The shafts 130 and 131 are rotatably mounted in bearings 132 and 133, Fig. 6, fixed in the hubs 134 and 135 of a stationary mounting member 136, the mounting member being suitably stationed in a fixed position on standards 137.

138 designates the transmission gear housing, one side of which is provided with an opening having a bearing 139 for rotatably mounting that side of the housing on the shaft 130 and the other side of which is closed by a plate or the like 140 fixed to the gear housing 138 by fastening devices 141. The plate 140 is provided with a hub 142 having a centrally disposed bearing 143 therein for rotatably mounting the fixed plate on the shaft 131.

Sun gears 144 and 145 are keyed to the extreme inner ends of the shafts 130 and 131 respectively, as shown at 146 and 147, the sun gear 145 being provided with a bearing 148 adapted to rotatably mount the sun gear 145 on the inner end of the shaft 130. The side wall 149 of the transmission gear housing and the plate 140 closing the opposite side of the housing are provided with aligned oppositely disposed openings for receiving shafts therein on which planetary gears 150 and 151 are rotatably mounted. Each of the planetary gears is provided with a set of gear teeth 154 adapted to mesh with the teeth of the sun gear 144 and a set of gear teeth 155 adapted to mesh with the gear teeth of the sun gear 145.

It is thus apparent that, as the driven shaft 130 is rotated, such rotation is transmitted through the sun gear 144 to the planetary gears 150 and 151, thence to the sun gear 145 which rotates the driving shaft 131 in such a manner that the power thereof may be taken off for any desired purpose.

In order to control rotation of the gear transmission housing and speed of actuation of the driving member 131, the gear housing is provided with a peripheral cam follower 156 of varying thickness, the outer periphery 157 of the cam follower being engageable with the lower faces of each of a plurality of reciprocating pump plungers 158, one of which is particularly illustrated in Fig. 7.

The plungers 158 are slidably mounted in cylinders 159 mounted on the inner face of the stationary mounting 136 in spaced relation to each other and in alignment with the cam follower 156. The upper ends of the plungers are provided with sealing rings or the like 160 fixed thereto as by fastening devices 161 and the plungers are each normally urged downwardly into engagement with the cam follower by a spring 162 having its lower end seating in a recess 163 in the upper end of the plungers and its upper end seating in a recess 164 in each of a plurality of valve heads 165. The valve heads 165 are each suitably mounted on the stationary mounting in sealing relation to each of the cylinders 159 and are provided at opposite ends with openings for receiving discharge and flow line connections 166 and 167 respectively, which lead to spaced chambers 168 and 169 in each head. An inlet valve 170 is provided in each chamber 169 which seats on a valve seat 171 communicating the interior of the cylinder 159 with the chamber 169, and which has a valve stem 172 extending into a cage or the like 173, the valve stem normally being urged upwardly to maintain the valve 170 closed by a spring 174, the respective ends of which bear against the lower end of the cage and a washer 175 on the upper end of the valve stem.

The discharge chambers 168 are each provided with an opening 176 leading to the interior of the cylinder 159, and an outlet valve 177 normally seats in the opening 176 in response to pressure of a spring 178 in the valve cage 179 which bears against the upper end of the valve stem 180 to maintain the valve 177 closed.

The flow and discharge lines 167 and 166 respectively provide a common circulation system between each of a plurality of plunger pumps 181 to 186 respectively. More particularly, flow initiates from a fluid pressure medium reservoir 187 and flows through the line 188 where it connects with the flow line 167 as at 189. Flow of pressure fluid medium is directed to each of the chambers 169 of the plunger pumps 181 to 186 and opens the valves 170 therein to fill the space 190 above the pump plungers.

When power is applied to the driven shaft 130, it rotates the transmission gear housing in such a manner that the high lobe portion of the cam follower forces the pump plungers into the cylinders and forces fluid pressure medium upwardly therein to open the valves 177. The fluid pressure medium then backs up against pressure in the discharge line 166 in the direction of the connecting line 191, Fig. 5, leading to the reservoir 187.

As in the other forms of invention, a throttle valve 192 is provided in the discharge line and, in the present instance, a pressure gauge 193 is also provided in the connecting line 191 for indicating pressures in the line forming a resistance to rotation of the transmission housing in such a manner that the throttle valve may be adjusted in relation to the indicated pressures and speed of rotation desired to be imparted to the driving shaft 131.

A by-pass line 194 is also mounted in the connecting line 191 for by-passing fluid pressure medium about the throttle valve, a relief valve 195 being provided in the by-pass line which may be set to pass fluid pressure medium therethrough in response to an excess of pressure over a predetermined maximum in the circulation system.

The operation of an apparatus constructed in accordance with this modified form of invention is as follows:

Power is applied in a suitable manner to rotate the driven shaft 130, which, through the sun gear 144, and the planetary gears 150 and 151, rotates the transmission gear housing 138 which in turn rotates the driving shaft 131 through the planetary gears and the sun gear 145. As the transmission gear housing rotates, the cam follower thereon engages the pump plungers and depresses them to force fluid pressure medium into the discharge line 166 through the outlet valves 177. Resistance to movement of the fluid pressure medium and consequently the pump plungers is regulated by the throttle valve 192 as determined by observation of the gauge 193 to the end that the proper amount of resistance may be applied to rotation of the transmission gear housing and the driving shaft 131. In case pressures in the circulation lines exceed a predetermined maximum, the relief valve 195 permits fluid pressure medium to by-pass the throttle valve in such a manner that excessive strains on the apparatus generally are avoided.

The principal advantages in an apparatus constructed as described are that actuation of a driving member may be positively and smoothly controlled without imparting unnecessary strains to the apparatus as a whole and a variable speed of actuation may thus be imparted to a mechanism driven by the driving shaft. Fluctuations in speed of actuation of a mechanism receiving power from the transmission are maintained at a minimum in relation to any single setting of the controls. The apparatus is of durable construction, is efficient in operation and is well adapted for the controlled transmission of mechanical power for any desired purpose.

What I claim and desire to secure by Letters Patent is:

1. In combination with a power transmission mechanism, means for varying speed of said mechanism including a reversible rotary pump actuated by said mechanism, a fluid source, separate ducts connecting the pump with the fluid source and each adapted to pass fluid under pump pressure to the source of supply and from the source of supply to the pump depending upon direction of pump rotation, throttle valves in the respective ducts for selectively resisting flow of the fluid through said ducts, by-passes connected with the ducts on the respective sides of the throttle valves, and fluid release means arranged in each by-pass to release fluid discharged by the pump for passing said fluid around the throttle valves when predetermined pressures are reached in the ducts.

2. In combination with a power transmission mechanism, means for varying speed of said mechanism including a reversible rotary pump actuated by said mechanism, a fluid source, separate ducts connecting the pump with the fluid source and each adapted to pass fluid under pump pressure to the source of supply and from the source of supply to the pump depending upon direction of pump rotation, throttle valves in the respective ducts for selectively resisting flow of the fluid through said ducts, by-passes connected with the ducts on the respective sides of the throttle valves, fluid release means arranged in each by-pass to release fluid discharged by the pump for passing said fluid around the throttle valves when predetermined pressures are reached in the ducts, and indicator means connected in said ducts on the pump side of the throttle valves for indicating extent of control by said speed varying means.

CHESTER A. MATHEY.